(12) United States Patent
Mogelin

(10) Patent No.:  US 12,634,621 B2
(45) Date of Patent:       May 19, 2026

(54) COMPACT VIBRATION SENSOR

(71) Applicant: Sonion Nederland B.V., Hoofddorp (NL)

(72) Inventor: Raymond Mogelin, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 99 days.

(21) Appl. No.: 18/722,368

(22) PCT Filed: Jan. 30, 2023

(86) PCT No.: PCT/EP2023/052140
§ 371 (c)(1),
(2) Date: Jun. 20, 2024

(87) PCT Pub. No.: WO2023/144365
PCT Pub. Date: Aug. 3, 2023

(65) Prior Publication Data
US 2025/0159402 A1      May 15, 2025

(30) Foreign Application Priority Data
Jan. 31, 2022    (EP) ..................................... 22154234

(51) Int. Cl.
*H04R 1/28*          (2006.01)
*G01H 11/06*        (2006.01)
(52) U.S. Cl.
CPC ........... *H04R 1/2811* (2013.01); *G01H 11/06* (2013.01); *H04R 2201/003* (2013.01)
(58) Field of Classification Search
CPC . H04R 1/2811; H04R 2201/003; G01H 11/06
(Continued)

(56) References Cited

U.S. PATENT DOCUMENTS 10,097,918  B2 * 10/2018  Spoettl ...................... H04R 3/00
2010/0284553  A1 * 11/2010  Conti .................... B81B 7/0061
381/174
(Continued)

FOREIGN PATENT DOCUMENTS

CN          110972045 A      4/2020
CN          113447115 A      9/2021
(Continued)

OTHER PUBLICATIONS

International Search Report for International Application No. PCT/EP2023/052140 dated Apr. 17, 2023.
(Continued)

*Primary Examiner* — Sean H Nguyen
(74) *Attorney, Agent, or Firm* — Harness, Dickey & Pierce, P.L.C.

(57)                    ABSTRACT

The present invention relates to vibration sensor comprising a pressure detecting arrangement for detecting generated pressure variations, wherein the pressure detecting arrangement comprises a MEMS die and a signal processor, wherein the MEMS die comprises a front volume and a MEMS cartridge, and wherein the MEMS die comprises oppositely arranged first and second surfaces; a pressure generating arrangement for generating pressure variations in a coupling volume in response to vibrations of the vibration sensor, wherein the pressure generating arrangement comprises a frame structure comprising an indentation, a suspension member comprising first and second surfaces and a moveable mass secured to at least part of the first or second surfaces of the suspension member; and a PCB comprising a first surface, and a housing secured to the first surface of the PCB using an adhesive, wherein the housing and the first surface of the PCB define, in combination, a volume within which volume the pressure detecting arrangement and the pressure generating arrangement are arranged, wherein the (Continued)

coupling volume is defined by the indentation of the frame structure and at least part of the second surface of the suspension member, and wherein said coupling volume is acoustically connected to the MEMS cartridge of the MEMS die via an acoustical opening in the frame structure, and wherein the first surface of the MEMS die is secured to at least part of the frame structure, and wherein at least part of the second surface of the MEMS die is secured to the first surface of the PCB. The present invention further relates to a hearing device comprising such a vibration sensor, and to use of such a vibration sensor for detecting voice induced vibrations in the skull of a user of a hearing device.

15 Claims, 3 Drawing Sheets

(58) Field of Classification Search
USPC ........................................................ 381/174
See application file for complete search history.

(56) References Cited

U.S. PATENT DOCUMENTS

| | | | |
|---|---|---|---|
| 2017/0156002 | A1 | 6/2017 | Han et al. |
| 2019/0335271 | A1 | 10/2019 | Post et al. |
| 2021/0017015 | A1 | 1/2021 | Mögelin et al. |
| 2021/0364346 | A1 | 11/2021 | Chen et al. |
| 2022/0127135 | A1* | 4/2022 | Mogelin .................. H04R 1/08 |

FOREIGN PATENT DOCUMENTS

| | | |
|---|---|---|
| EP | 3342749 A2 | 7/2018 |
| WO | 2020000594 A1 | 1/2020 |

OTHER PUBLICATIONS

Written Opinion for International Application No. PCT/EP2023/052140 dated Jan. 31, 2023.
International Preliminary Report on Patentability for International Application No. PCT/EP2023/052140 dated Dec. 8, 2023.

* cited by examiner

COMPACT VIBRATION SENSOR

This application is a national phase under 35 U.S.C. § 371 of PCT International Application No. PCT/EP2023/052140 which has an International filing date of 30 Jan. 2023, which claims priority to European Application No. 22154234.3, filed 31 Jan. 2022, the entire contents of each of which are hereby incorporated by reference.

FIELD OF THE INVENTION

The present invention relates to a vibration sensor where mechanical vibrations of the vibration sensor are detected via detection of pressure variations within the vibration sensor. The present invention relates, in particular, to a vibration sensor where a pressure detecting arrangement and a pressure generating arrangement are arranged in a space-saving manner without compromising the sensitivity, and thus the performance, of the vibration sensor.

BACKGROUND OF THE INVENTION

The integration of micro-electromechanical transducers in the form of vibration sensors into hearing devices, such as hearing aids and earbuds, has increased significantly over the past decade. The benefits of integrating micro-electromechanical transducers (vibration sensors) into hearing devices are many-including noise reduction via bone conduction voice pick-up where it is intended to detect voice induced vibrations in the skull of the user of the hearing device as well as control of the hearing device via tapping.

An example of a prior art micro-electromechanical transducer may for example be found in EP 3 342 749 A2 which relates to a micro-electromechanical transducer in the form of a vibration sensor comprising a stand-alone and self-contained MEMS microphone and a sub-assembly attached thereto. MEMS is an abbreviation for a micro-electromechanical system. The sub-assembly is adapted to generate pressure variations when the micro-electromechanical transducer is exposed to vibrations, whereas the MEMS microphone is adapted to detect and convert detected pressure variations to an electrical output signal. The micro-electromechanical transducer suggested in EP 3 342 749 A2 is disadvantageous due to its relative significant height.

Other examples of prior art micro-electromechanical transducers may for example be found in CN 113447115, CN 110972045 and US 2021/364346 A1, but also these transducers suffer from their respective heights.

It may therefore be seen as an object of embodiments of the present invention to provide a compact vibration sensor with both a small footprint and a minimal height.

It may be seen as a further object of embodiments of the present invention to provide a compact vibration sensor with minimal dimensions without compromising the sensitivity, and thus the performance, of the vibration sensor.

DESCRIPTION OF THE INVENTION

The above-mentioned objects are complied with by providing, in a first aspect, a vibration sensor comprising
- a pressure detecting arrangement for detecting generated pressure variations, wherein the pressure detecting arrangement comprises a MEMS die and a signal processor, wherein the MEMS die comprises a front volume and a MEMS cartridge, and wherein the MEMS die comprises oppositely arranged first and second surfaces,

- a pressure generating arrangement for generating pressure variations in a coupling volume in response to vibrations of the vibration sensor, wherein the pressure generating arrangement comprises a frame structure comprising an indentation, a suspension member comprising first and second surfaces and a moveable mass secured to at least part of the first or second surfaces of the suspension member, and
- a PCB comprising a first surface, and a housing secured to the first surface of the PCB using an adhesive, wherein the housing and the first surface of the PCB define, in combination, a volume within which volume the pressure detecting arrangement and the pressure generating arrangement are arranged,
- wherein the coupling volume is defined by the indentation of the frame structure and at least part of the second surface of the suspension member, and wherein said coupling volume is acoustically connected to the MEMS cartridge of the MEMS die via an acoustical opening in the frame structure, and wherein
- the first surface of the MEMS die is secured to at least part of the frame structure, and wherein at least part of the second surface of the MEMS die is secured to the first surface of the PCB.

Thus, the vibration sensor according to the first aspect comprises a pressure generating arrangement for generating pressure variations in response to vibrations of the vibration sensor, and a pressure detecting arrangement for detecting these generated pressure variations. The vibration sensor may form part of a hearing device, such as ear buds, where it is intended to detect voice induced vibrations in the skull of the user of the hearing device when the hearing device is positioned in the ear canals of the user.

In terms of functioning, the suspension member and the moveable mass secured thereto are adapted to vibrate when the vibration sensor is exposed to external mechanical vibrations. The vibrations of the suspension member and the moveable mass generate pressure variations in the coupling volume defined by the indentation of the frame structure and at least part of the second surface of the suspension member. The generated pressure variations are allowed to enter the MEMS die via the acoustical opening in the frame structure and thus be detected by for example a biased capacitive read-out mechanism (MEMS cartridge) formed by a moveable membrane and a rigid back-plate in combination. The MEMS cartridge may also involve other detection schemes, such as piezoresistive, piezoelectric and charged plate capacitor detection schemes. The size of the acoustical opening may be used to provide an acoustical impedance in order to dampen the resonance peak. Alternatively, the acoustical opening may comprise an acoustical filter in the form of for example a mesh grid to provide the same effect. Moreover, the MEMS die may comprise a small opening providing a barometric compensation between the front volume and the volume defined by the housing and the first surface of the PCB in combination. This opening defines the low-frequency cut-off of the vibration sensor.

The resonance frequency of the vibration sensor may be within the frequency range 1-10 kHz. It is advantageous that the height of the gap of the volume defined by the indentation of the frame structure and at least part of the second surface of the suspension member can be accurately controlled via the depth of the indentation. By properly selecting the gap the resonance peak may be reduced via squeeze film damping—the narrower the gap the higher the squeeze film damping. Moreover, the height of the gap between frame structure and suspension member, and the height of the gap between moveable mass and the housing are important because these heights or distances limit the deflection of the suspension member in both directions if the vibration sensor is exposed to severe mechanical shocks. In addition, these heights or distances also limit the generated pressure inside the vibration sensor due to such shocks.

The signal processor, which may be either an analog or a digital signal processor, is adapted to process signals from the MEMS die. The processed signals from the signal processor are subsequently made available to external electrical devices, such as filters, amplifiers etc. As it will be discussed in further details below the MEMS die and the signal processor may be mutually connected via a printed circuit board (PCB).

At least part of the frame structure may be secured to the first surface of the MEMS die using a compliant adhesive in a manner so that the acoustical opening of the frame structure is aligned with the front volume of the MEMS die. The use of a compliant adhesive is advantageous in order to prevent that mechanical stress, due to mismatch in thermal expansion coefficients, propagate to the MEMS die. Securing at least part of the frame structure directly to the first surface of the MEMS die is also advantageous in that it reduces the overall height of the vibration sensor. As it will be disclosed in further details below the frame structure may be secured to the MEMS die at the front volume so that the frame structure, with the exception of the acoustical opening, closes the front volume of the MEMS die and thus separates the combination of the coupling volume and the front volume of the MEMS die from the remaining volumes of the vibration sensor.

The coupling volume defined by the indentation of the frame structure and at least part of the second surface of the suspension member may be acoustically connected to a first surface of the moveable membrane of the MEMS die. More particularly, said coupling volume may be acoustically connected to a first surface of the moveable membrane of the MEMS die via the front volume of the MEMS die in case the first surface of the moveable membrane faces the front volume of the MEMS die.

With respect to securing the MEMS die to the PCB, at least part of the second surface of the MEMS die may be secured to the first surface of the PCB using one or more electrically conducting connection pads arranged on the second surface of the MEMS die, and a volume (formed by the gap between the MEMS die and the PCB) may exist between the second surface of the MEMS die and the first surface of the PCB, said volume being acoustically connected to a second surface of the moveable membrane of the MEMS cartridge. The one or more electrically conducting connection pads may comprise one or more solder bumps, one or more solder pads or one or more gold bumps (in combination with a conductive adhesive) having a certain height which determines the distance, and affects the volume, between the second surface of the MEMS die and the first surface of the PCB.

Preferably, the volume between the second surface of the MEMS die and the first surface of the PCB is acoustically connected to the volume defined by the housing and the first surface of the PCB. Thus, the volume defined by the housing and the first surface of the PCB may be considered a coherent and continuous volume which is not divided into separate compartments.

The frame structure and its indentation may extend beyond the dimensions of the MEMS die in order to maximise the dimensions of the suspension member. Thus, the dimensions of the frame structure may be significantly larger than the dimensions of the MEMS die at the first surface of the MEMS die where the frame structure is secured to the MEMS die. This is advantageous in that the dimensions of the suspension member, and thus the sensitivity of the vibration sensor, may be optimised.

The indentation in the frame structure may be surrounded by a projecting peripheral rim, and at least part of the second surface of the suspension member may be secured to the projecting peripheral rim of the frame structure using a compliant adhesive. The height of the projecting peripheral rim sets the height of the gap of the volume defined by the indentation of the frame structure and at least part of the second surface of the suspension member.

One or more electrical contact pads for electrically connecting the vibration sensor to external electronic devices may be arranged on a second surface of the PCB. The first and second surfaces of the PCB may form opposite surfaces of the PCB, and the one or more electrical contact pads may comprise one or more solder bumps.

The vibration sensor comprises a housing secured to the first surface of the PCB using an adhesive. Preferably, this adhesive comprises a conductive adhesive, including soldering. Using a conductive adhesive is advantageous in that the housing can then be electrically connected to the PCB and thus form a shielding against electrical interference. As already mentioned the housing and the first surface of the PCB define, in combination, a volume within which volume the pressure detecting arrangement and the pressure generating arrangement are arranged. Thus, the volume defined by housing and the first surface of the PCB in combination houses the MEMS die, the signal processor, the frame structure, the suspension member and the moveable mass secured to the suspension member. The primary role of the housing is to protect the active elements of the vibration sensor against for example intrusive moisture and ear vax. Moreover, the housing also minimises the risk of cross-sensitivity to surrounding sound.

In terms of implementation the housing may be implemented as a stainless steel housing, or it may be implemented using a laminated structure of PCB materials. In case of a stainless steel housing the shape of the housing may be provided using for example deep-drawing or punching. The housing may comprise a through-going opening adapted to vent the volume defined by the housing and the first surface of the PCB. The purpose of this opening is to prevent excessive pressure inside the housing during reflow soldering. The opening needs to be very small in order to provide barometric compensations and still prevent acoustic leakage. Alternatively, the opening may be sealed with an adhesive or sticky tape after the reflow. The frame structure may also be implemented in stainless steel. The indentation provided in the frame structure may be provided by various means, such as etching, punching and deep-drawing. Alternatively, the frame structure may comprise a plurality of stacked layers, such as a plurality of metal layers arranged on top of each other.

The suspension member may be implemented as a film, such as a polyimide (Kapton) or silicone film. In case of a polyimide film the thickness of the film may be around 5 μm. Alternatively, the suspension member may comprise a static part and moveable part being hinged together, and wherein one or more openings exist between the static and the moveable parts. The one or more openings may be at least partly filled with a flexible sealant, such as a gel. The static and moveable parts of the suspension member may be manufactured is an integrated and one-piece component also including one or more hinges that operatively connects the static and moveable parts. The moveable mass may be implemented in a high-density material, such as tantalum mass or stainless steel, and the mass of the moveable mass is preferably higher than 3 mg in order to ensure a low self-noise of the vibration sensor. The self-noise of the vibration sensor should preferably be below –75 dB (A) re. 1 g.

The suspension member should be able to withstand typical reflow temperatures, i.e. suspension member should be capable of withstanding temperatures of at least 80° C., such as at least 100° C., such as at least 120° C., such as at least 150° C., such as at least 200° C., such as at least 250° C., such as at least 300° C., such as at least 350° C., such as at least 400° C. The moveable mass may be secured to the first surface of the suspension member using a compliant adhesive, or the moveable mass may be secured to the second surface of the suspension member using a compliant adhesive. It should though be noted that moveable masses may be secured to both the first and second surfaces of the suspension member.

As the vibration sensor may form part of a hearing device the dimensions of the vibration sensor (width, length and height) are smaller than 3 mm, 4 mm and 2 mm, respectively. Thus, the footprint of the vibration sensor measures at most 3 mm by 4 mm, whereas the overall height of the vibration sensor is smaller than 2 mm.

In a second aspect the present invention relates to a hearing device comprising a vibration sensor according to the first aspect, wherein the hearing device comprises a hearing aid, a hearable, a headset, an earbud or a similar device.

In a third aspect the present invention relates to a use of a vibration sensor according to the first aspect, wherein the vibration sensor is used for detecting voice induced vibrations in the skull of the user of the hearing device, and wherein the detected voice induced vibrations are used for voice recognition of the user's own voice. The step of recognising of the user's own voice may be implemented by using a voice recognition algorithm where predetermined characteristics, such as the frequency content, of the detected voice induced vibrations are compared to the same characteristics of the user's own voice.

In general, the various aspects of the present invention may be combined and coupled in any way possible within the scope of the invention. These and other aspects, features and/or advantages of the present invention will be apparent from and elucidated with reference to the embodiments described hereinafter.

BRIEF DESCRIPTION OF THE DRAWINGS

The present invention will now be described with reference to the accompanying drawings where.

DETAILED DESCRIPTION OF THE INVENTION

In general, the present invention relates to a compact vibration sensor where, in particular, a pressure detecting arrangement and a pressure generating arrangement are arranged in a stacked and space-saving arrangement.

Figure 1:
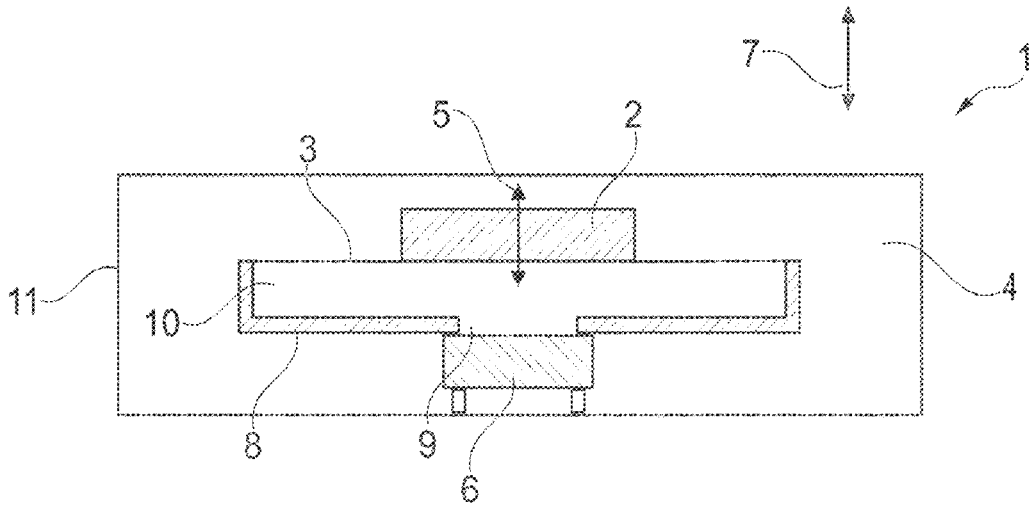
FIG. 1 illustrates a schematic view of the principle underlying the vibration sensor of the present invention.

Referring now to FIG. 1 the general principle underlying the present invention is depicted. Generally, the vibration sensor 1 of the present invention is adapted to generate pressure variations in response to vibrations of the vibration sensor 1, i.e. generate pressure variations when the vibration sensor 1 is exposed to external mechanical vibrations, and subsequently detect the generated pressure variations. Thus, the detected pressure variations are a measure for the external mechanical vibrations to which the vibration sensor is exposed. As depicted in FIG. 1 the vibration sensor 1 comprises a moveable mass 2 which is adapted to move up and down as indicated by the arrow 5 in response to mechanical vibrations of the vibration sensor as indicated by the arrow 7. The moveable mass 2 is suspended in a suspension member 3 whereby the moveable mass 2 is allowed to move up and down as indicated by the arrow 5. An upward displacement of the moveable mass 2 will cause an increase of the air pressure in the volume 4, and a decrease in the coupling volume 10. A downward displacement of the moveable mass 2 has the opposite effect. A pressure detecting arrangement 6 is provided for detecting the generated pressure variations, or more particularly, for detecting the generated pressure differences between the volume 4 and the coupling volume 10. As seen in FIG. 1 the coupling volume 10 is defined by the suspension member 3 and the frame structure 8, whereas the second volume 4 is defined by the housing 11 and the frame structure 8. A vibration sensor of the type depicted in FIG. 1 typically has a resonance frequency around a few kHz, such as between 1 kHz and 10 KHz. Although FIG. 1 only depicts the general principle underlying the present invention actual implementations of the vibration sensor will be disclosed in relation to FIGS. 2 and 3.

Figure 2:
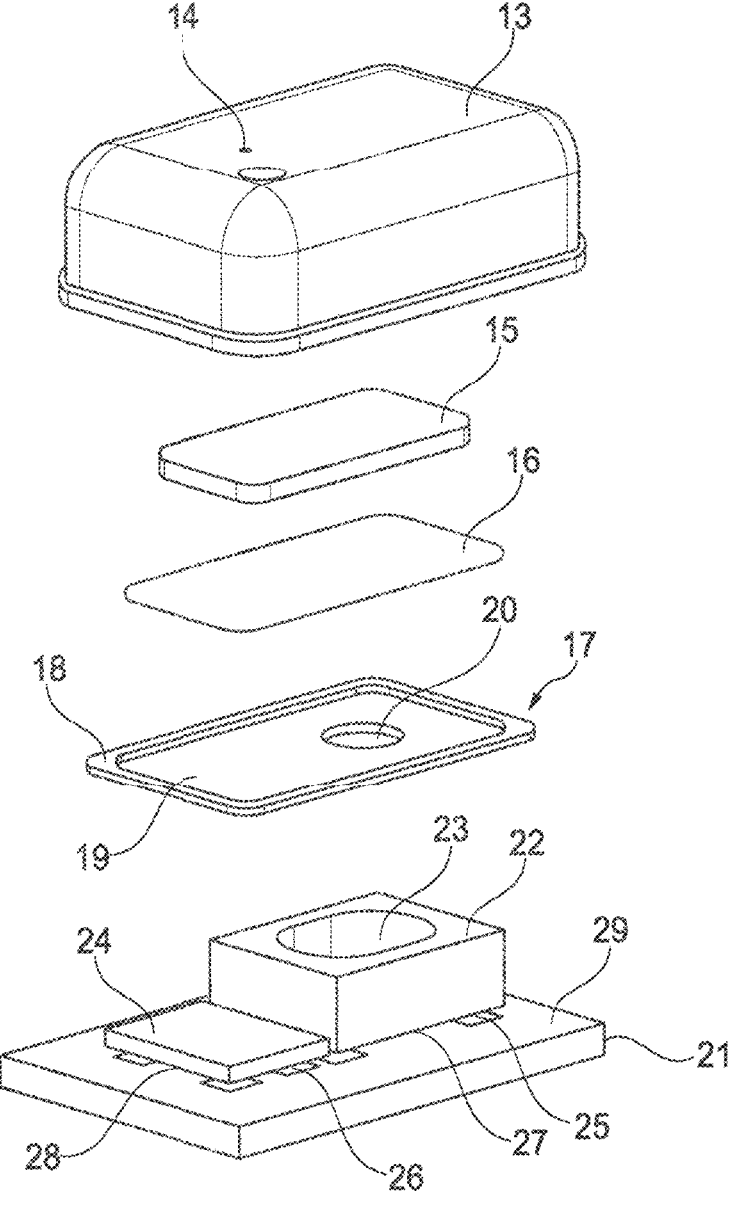
FIG. 2 shows an exploded view of an embodiment of the vibration sensor.

Referring now to FIG. 2, an exploded view of an embodiment of the vibration sensor is depicted. Starting from the bottom the vibration sensor comprises a MEMS die 22 and a signal processor 24 arranged on a first surface 29 of a PCB 21. Both the MEMS die 22 and the signal processor 24 are electrically connected to the PCB 21 via respective solder pads 25, 26 in a manner so that respective volumes 27, 28 exist between a second (lower) surface of the MEMS die 22 and the first surface 29 of the PCB 21, and between the signal processor 24 and the first surface 29 of the PCB 21, cf. also FIG. 3. The signal processor 24 is adapted to process signals from the MEMS die 22, and the processed signals from the signal processor 24 are subsequently provided on one or more electrical contact pads (not shown in FIG. 2) arranged on a second (lower) surface of the PCB 21 whereby the vibration sensor can be easily connected to external electrical devices.

The MEMS die comprises a front volume 23 and MEMS cartridge which may involve a capacitor comprising a moveable membrane and a rigid back-plate. The MEMS cartridge is facing the first surface 29 of the PCB 21 and are therefore not visible in FIG. 2.

The MEMS die 22, the signal processor 24 and optionally the PCB 21 may be considered the pressure detecting arrangement as these elements are adapted to detect generated pressure variations in response to vibrations of the vibration sensor. The footprint of the vibration sensor (width and length) is smaller than 3 mm and 4 mm, respectively, whereas the overall height of the vibration sensor when assembled is smaller than 2 mm.

Still referring to FIG. 2 the pressure variations are generated by the pressure generating arrangement which comprises a frame structure 17, a suspension member 16 and a moveable mass 15 secured to a first (upper) surface of the suspension member 16. As seen in FIG. 2 the frame structure 17 comprises an indentation 19 surrounded by a projecting peripheral rim 18. When assembled at least part of a second (lower) surface of the suspension member 16 is secured to the projecting peripheral rim 18 of the frame structure 17. With this arrangement a coupling volume (reference numeral 36 in FIG. 3) is defined by the indentation 19 of the frame structure 17 and at least part of the second (lower) surface of the suspension member 16. When assembled that the frame structure 17 is secured to the MEMS die 22 in a manner so that the before-mentioned coupling volume is acoustically connected to the front volume 23 of the MEMS die 22 via an acoustical opening 20 in the frame structure 17. The acoustical connection between the before-mentioned coupling volume and the front volume 23 of the MEMS die 22 is provided by physically aligning the acoustical opening 20 with the front volume 23 so that pressure variations generated in the before-mentioned coupling volume are allowed to enter the front volume 23 of the MEMS die 22 and thus be detected It should also be noted that the frame structure 17, including its indentation 19, extends beyond the dimensions of the MEMS die 22 thereby the dimensions of the suspension member 16 secured thereto can be maximised which also leads to an increased sensitivity of the vibration sensor. When assembled, and as it will be discussed in further details in relation to FIG. 3, the frame structure 17 overhangs the signal processor 24. The frame structure 17 is implemented in stainless steel, and the indentation 19 provided therein has been provided by etching. The suspension member 16 is implemented as a polyimide film, and the moveable mass 15 secured thereto is a tantalum or stainless steel mass. As mentioned above other types of suspension members 16 and moveable masses 15 are also applicable.

The embodiment depicted in FIG. 2 also comprises a housing 13 which, when assembled, is secured to the PCB 21 using a sealant. Thus, the housing 13 and the PCB 21 forms a volume within which volume the MEMS die 22, the signal processor 24 and the pressure generating arrangement comprising the frame structure 17, the suspension member 16 and the moveable mass 15 secured thereto are arranged. The housing 13 is made of stainless steel, and a venting opening 14 optionally be provided therein. The venting opening 14 provides a venting passage between the volume defined by the housing 13 and the PCB 21.

Figure 3:
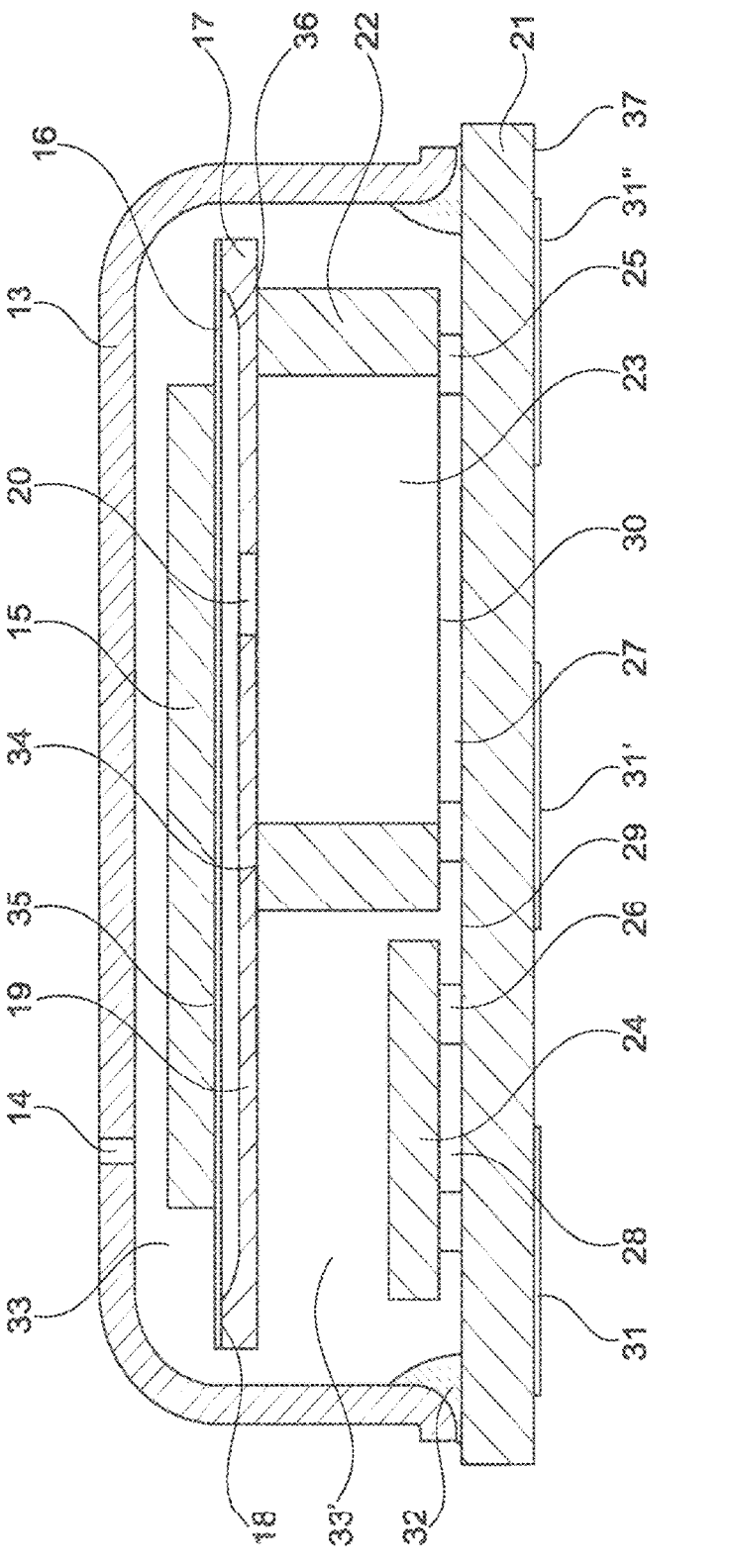
FIG. 3 shows a cross-sectional view of an assembled embodiment of the vibration sensor.

Turning now to FIG. 3 a cross-sectional view of an assembled vibration sensor is depicted. As already mentioned in relation to FIG. 2 the vibration sensor comprises a MEMS die 22 and a signal processor 24 arranged on a first surface 29 of a PCB 21. Both the MEMS die 22 and the signal processor 24 are electrically connected to the PCB 21 via respective solder pads 25, 26 in a manner so that respective volumes 27, 28 exist between a second (lower) surface of the MEMS die 22 and the first surface 29 of the PCB 21, and between the signal processor 24 and the first surface 29 of the PCB 21. In FIG. 3 the second (lower) surface of the MEMS die is at least partly constituted by the MEMS cartridge 30.

The signal processor 24 is adapted to process signals from the MEMS die 22, and the processed signals from the signal processor 24 are subsequently provided on one or more electrical contact pads 31, 31', 31" arranged on a second surface 37 of the PCB 21 in order to form easy electrical access to external electrical devices.

The MEMS die 22 comprises a front volume 23 and a MEMS cartridge 30 in the form of a capacitor comprising a moveable membrane and a rigid back-plate. As mentioned above the MEMS cartridge 30 of the MEMS die 22 may involve other detection schemes, such as piezoresistive, piezoelectric or charged plate capacitor detected schemes. As seen in FIG. 3 the MEMS cartridge 30 faces the first surface 29 of the PCB 21, whereas the front volume 23 of the MEMS die is facing away from the first surface 29 of the PCB 21. As also mentioned in relation to FIG. 2 the MEMS die 22, the signal processor 24 and optionally the PCB 21 may be considered the pressure detecting arrangement of the vibration sensor as these elements are adapted to detect generated pressure variations in response to vibrations of the vibration sensor. Again, the footprint of the vibration sensor (width and length) is smaller than 3 mm and 4 mm, respectively, whereas the overall height of the vibration sensor is smaller than 2 mm.

The pressure generating arrangement of the vibration sensor depicted in FIG. 3 comprises a frame structure 17, a suspension member 16 and a moveable mass 15 secured to a first (upper) surface 35 of the suspension member 16 using a compliant adhesive. The frame structure 17 comprises an indentation 19 surrounded by a projecting peripheral rim 18 to which projecting peripheral rim 18 at least part of a second (lower) surface of the suspension member 16 is secured using a compliant adhesive. With this arrangement a coupling volume 36 is defined by the indentation 19 of the frame structure 17 and at least part of the second (lower) surface of the suspension member 16.

As seen in FIG. 3 the frame structure 17 is secured directly to the first surface 34 of the MEMS die 22 using a compliant adhesive in order to compensate for different thermal expansion coefficients. As also seen in FIG. 3 the coupling volume 36 is acoustically connected to the front volume 23 of the MEMS die 22 via an acoustical opening 20 in the frame structure 17. As already addressed the acoustical connection between the coupling volume 36 and the front volume 23 of the MEMS die 22 is provided by physically aligning the acoustical opening 20 with the front volume 23 so that pressure variations generated in the coupling volume 36 are allowed to enter the front volume 23 of the MEMS die 22 and thus be detected As seen in FIG. 3 the frame structure 17, including its indentation 19, extends beyond the dimensions of the MEMS die 22 and thus overhangs the signal processor 24. This is advantageous in that the dimensions of the suspension member 16 can be maximised which also leads to an increased sensitivity of the vibration sensor. The frame structure 17 is implemented in stainless steel, and the indentation 19 provided therein has been provided by etching. The suspension member 16 is implemented as a polyimide film, and the moveable mass 15 secured thereto is a tantalum or stainless steel mass.

As seen in FIG. 3 the embodiment further comprises a housing 13 which is secured to the PCB 21 using a conductive adhesive 32 so that the housing 13 and the PCB 21 form, in combination, a shield against electric interference. As already mentioned, the housing 13 and the PCB 21 forms a volume 33, 33' within which volume 33, 33' the MEMS die 22, the signal processor 24 and the pressure generating arrangement comprising the frame structure 17, the suspension member 16 and the moveable mass 15 secured thereto are arranged. It should be noted that the two volumes 33, 33' are mutually acoustically connected as well as acoustically connected to the volumes 27, 28 below the MEMS die 22 and the signal processor 24, respectively. Again, the housing 13 is made of stainless steel, and a venting opening 14 may optionally be provided therein. The venting opening 14 provides a venting passage between the volume 33 and the exterior of the vibration sensor.

Although the present invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims, without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A vibration sensor comprising
   a pressure detecting arrangement for detecting generated pressure variations, wherein the pressure detecting arrangement comprises a MEMS die and a signal processor, wherein the MEMS die comprises a front volume and a MEMS cartridge, and wherein the MEMS die comprises oppositely arranged first and second surfaces,
   a pressure generating arrangement for generating pressure variations in a coupling volume in response to vibrations of the vibration sensor, wherein the pressure generating arrangement comprises a frame structure comprising an indentation, a suspension member comprising first and second surfaces and a moveable mass secured to at least part of the first or second surfaces of the suspension member, and
   a PCB 2 comprising a first surface, and a housing secured to the first surface of the PCB using an adhesive, wherein the housing and the first surface of the PCB define, in combination, a volume (33, 33') within which volume the pressure detecting arrangement and the pressure generating arrangement are arranged,
   wherein the coupling volume is defined by the indentation of the frame structure and at least part of the second surface of the suspension member, and wherein said coupling volume is acoustically connected to the MEMS cartridge of the MEMS die via an acoustical opening in the frame structure, and wherein
   the first surface of the MEMS die is secured to at least part of the frame structure, and wherein at least part of the second surface of the MEMS die is secured to the first surface of the PCB.

2. A vibration sensor according to claim 1, wherein at least part of the frame structure is secured to the first surface of the MEMS die using a compliant adhesive in a manner so that the acoustical opening of the frame structure is aligned with the front volume of the MEMS die.

3. A vibration sensor according to claim 1, wherein the coupling volume defined by the indentation of the frame structure and at least part of the second surface of the suspension member is acoustically connected to a first surface of a moveable membrane of the MEMS die.

4. A vibration sensor according to claim 3, wherein at least part of the second surface of the MEMS die is secured to the first surface of the PCB using one or more electrically conducting connection pads, and wherein a volume exists between the second surface of the MEMS die and the first surface of the PCB, said volume being acoustically connected to a second surface of the moveable membrane of the MEMS die.

5. A vibration sensor according to claim 4, wherein the volume between the second surface of the MEMS die and the first surface of the PCB is acoustically connected to the volume defined by the housing and the first surface of the PCB.

6. A vibration sensor according to claim 1, wherein the frame structure and its indentation extend beyond dimensions of the MEMS die in order to maximise dimensions of the suspension member.

7. A vibration sensor according to claim 1, wherein the indentation is surrounded by a projecting peripheral rim, and wherein at least part of the second surface of the suspension member is secured to the projecting peripheral rim of the frame structure using a compliant adhesive.

8. A vibration sensor according to claim 1, wherein one or more electrical contact pads for electrically connecting the vibration sensor to external electronic devices are arranged on a second surface of the PCB.

9. A vibration sensor according to claim 1, wherein the housing is implemented as a stainless steel housing or as a laminated structure of PCB materials, and wherein the housing comprises a through-going opening adapted to vent the volume defined by the housing and the first surface of the PCB.

10. A vibration sensor according to claim 1, wherein the frame structure is implemented in stainless steel, and wherein the indentation provided in the frame structure has been provided by etching, punching or deep drawing, or wherein the frame structure comprises a plurality of stacked layers, such as a plurality of metal layers arranged on top of each other.

11. A vibration sensor according to claim 1, wherein the suspension member is implemented as a film, such as a polyimide or silicone film, or wherein the suspension member comprises a static part and moveable part being hinged together, and wherein one or more openings exist between the static part and the moveable part, said one or more openings being at least partly filled with a flexible sealant.

12. A vibration sensor according to claim 1, wherein dimensions of the vibration sensor (width, length and height) are smaller than 3 mm, 4 mm and 2 mm, respectively.

13. A vibration sensor according to claim 1, wherein the moveable mass is secured to the first surface of the suspension member using a compliant adhesive, or wherein the moveable mass is secured to the second surface of the suspension member using a compliant adhesive.

14. A hearing device comprising a vibration sensor according to claim 1, wherein the hearing device comprises a hearing aid, a hearable, a headset, an earbud or a similar device.

15. Use of a vibration sensor according to claim 1 in a hearing device, wherein the vibration sensor is used for detecting voice induced vibrations in a skull of a user of the hearing device, and wherein the detected voice induced vibrations are used for voice recognition of the user's own voice.

* * * * *